2,757,119

BIS-(2-CHLOROETHYL) CHLOROFUMARATE, FUNGICIDAL COMPOSITION OF SAID COMPOUND AND METHOD OF APPLYING SAME

George E. Bennett and Arthur H. Schlesinger, Dayton, Ohio, assignors to Monsanto Chemical Company, St. Louis, Mo., a corporation of Delaware No Drawing. Application November 12, 1953, Serial No. 391,714

3 Claims. (Cl. 167—22)

The present invention relates to chlorine-containing dicarboxylates and more particularly provides bis-(2-chloroethyl) chlorofumarate as a new compound, fungicidal compositions comprising the new compound and methods of inhibiting or entirely preventing fungus growth in which such compositions are used.

We have found that bis-(2-chloroethyl) chlorofumarate may be easily prepared by contacting ethylene chlorohydrin with a compound selected from the class consisting of chlorofumaric acid or a diacyl halide thereof. Formation of the bis-(2-chloroethyl) chlorofumarate is particularly easily effected by simply adding the chlorohydrin to a diacyl halide of a halofumaric acid at ordinary room temperatures, the reaction with the halide proceeding according to the scheme:

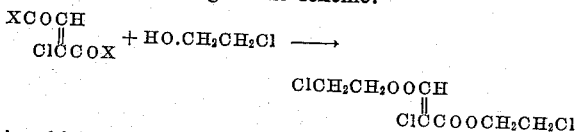

in which X is chlorine, bromine or iodine.

When working with the diacyl halides it may be advantageous to employ an alkaline material as catalyst although the reaction proceeds with formation of the present ester in very good yields even in the absence of such a catalyst. In some instances, particularly when operating with the acyl halide, operation at diminished pressure is advisable. A dehydrating agent is advantageously employed when chlorofumaric acid is used. As diacyl halides there may be used either chlorofumaryl chloride, chlorofumaryl bromide or chlorofumaryl iodide.

Bis-(2-chloroethyl) chlorofumarate is a stable, well-characterized compound which may be used for a number of industrial and agricultural purposes. We have found it to be particularly useful as the effective ingredient in compositions adapted to the treatment of plants and other organic materials which are subject to attack by fungi. The present ester is highly efficient in preventing and retarding fungus growth on plants, fruits, seeds, soils, leather, cotton, wood and organic materials in general. It may be applied directly to the organic material which is to be treated, but because the bis-(2-chloroethyl) chlorofumarate is effective in extremely dilute concentrations it is preferred to incorporate it with a carrier or diluent.

Fungicidal dusts may be prepared by mixing the present ester with dusting materials such as talc, clay, lime, bentonite, pumice, fuller's earth, etc. Bis-(2-chloroethyl) chlorofumarate is soluble in the usual organic solvents and may be used in solution, e. g., in benzene or kerosene solution as a fungicidal spray. Suspensions or oil-in-water emulsions are advantageously employed in the treatment of plants, textiles, leather and other materials with which it is not desirable to employ either a solid carrier or an organic solvent.

Fungicidal compositions comprising the present active ingredient may be applied only to the surface of the material to be treated as when treating foliage, furs, leather and other comparatively pregnable materials when fungus growth is to be prevented or retarded. In other cases, for example, when it is desired to protect seeds from soil micro-organisms harmful to the seeds and plants, the bis-(2-chloroethyl) chlorofumarate preferably, incorporated with a solid carrier, may be mixed with the seed. For protection of fruits, seedlings, plant tubers, etc., it may be advantageous to effect the treatment by employing baths comprising aqueous emulsions of the fungicide. Impregnation of textiles with the fungicides is also advantageously effected in baths.

While bis-(2-chloroethyl) chlorofumarate is a generally valuable fungicide, it differs from the usual organic fungicides and from prior known esters of fumaric or chlorofumaric acid in that it serves as a systemic fungicide and is of significant utility in the treatment of wheat, beans, etc. for rust control. Application of the fungicide either to the plants or to soils in which such plants are growing prevents growth of rust on plants which have been treated with the present fungicide or are supported by soils which have been treated with the fungicide and which normally support the growth of plant life. Growth of rust fungi may also be retarded or prevented by application of the present fungicidal composition to the plant by means of sprays or surface dusts.

The present invention is further illustrated, but not limited, by the following examples:

Example 1

To 40.2 g. (0.5 mole) of ethylene chlorohydrin there was gradually dropped 3.74 g. (0.2 mole) of chlorofumaryl chloride over a 10-minute period. The temperature rose to 50° C. After stirring the reaction mixture for an hour, it was distilled to give 44.3 g. (80% theoretical yield) of the substantially pure bis-(2-chloroethyl) chlorofumarate, a white liquid, B. P. 170°–175° C./6 mm., $n_D^{25}$ 1.5041, and analyzing as follows:

|  | Found | Calcd. for $C_8H_9O_4Cl_3$ |
|---|---|---|
| Percent C | 34.81 | 34.8 |
| Percent H | 3.35 | 3.27 |
| Percent Cl | 38.96 | 38.7 |

Example 2

This example describes evaluation of bis-(2-chloroethyl) chlorofumarate as a systemic fungicide against wheat rust.

Seven-day old seedlings of Seneca winter wheat were hand inoculated with wheat leaf rust, Puccinia rubigovera tritici (race 126). The inoculated plants were incubated for 36–40 hours at 68° F. in an illuminated high humidity chamber and then transferred to a greenhouse which was maintained at approximately 72° F. They were allowed to stand in the greenhouse for 72 hours and then treated with a spray containing the bis-(2-chloroethyl) chlorofumarate of Example 1. The spray consisted of water, containing an 0.25 per cent by weight concentration of the chlorofumarate, and an 0.1 per cent concentration of a commercial surfactant known to the trade as "Tween 20" and reputed to be a polyalkylene glycol hexitol anhydride long chain fatty acid partial ester. A "blank" spray, consisting of only water and 0.1 per cent of the "Tween 20" was also employed.

The inoculated plants were sprayed with an atomizer until run-off occurred. The plants were then held in the greenhouse until large pustules had developed on control plants, i. e., on inoculated plants which had not been sprayed and on inoculated plants which had been sprayed with the 0.1 per cent aqueous solution of the surfactant in absence of the chlorofumarate.

At the end of that time observation of the plants was made to determine the degree of rust. The number of infected plants were counted, the roots were examined and the infected plants graded with respect to the number of pustules. Plants which had been treated with the suspension of bis-(2-chloroethyl) chlorofumarate described above were substantially unaffected. The roots of all plants which had been contacted with the bis-(2-chloroethyl) chlorofumarate were in excellent condition. On the other hand inspection of plants which had been treated in the same way with related esters showed widespread infection as follows: At the same concentration, i. e., at the 0.25% concentration, use of bis-(2-ethylhexyl) chlorofumarate, di-n-octylchlorofumarate, di-n-octyl chloromaleate or of didodecyl chloromaleate instead of the bis-(2-chloroethyl) chlorofumarate in the treating suspension resulted in infection of the plants with development of a large number of pustules on each plant and brown, translucent and rotted roots. Like testing of dimethyl chlorofumarate revealed that this compound was phytotoxic to the seedlings, whereas plants which had been exposed to the bis-(2-chloroethyl) chlorofumarate remained in healthy condition.

What we claim is:

1. Bis-(2-chloroethyl) chlorofumarate.

2. A wheat rust fungi-inhibiting composition comprising an inert carrier and bis-(2-chloroethyl) chlorofumarate as the essential active ingredient.

3. The method of protecting wheat plants against rust fungi which comprises contacting said wheat with bis-(2-chloroethyl) chlorofumarate.

References Cited in the file of this patent

UNITED STATES PATENTS 2,218,181 Searle et al. ------------ Oct. 15, 1940

OTHER REFERENCES

Satta et al.: J. Am. Chem. Society, 75, 4101 (1953), received April 6, 1953.

Beilstein, vol. 2, p. 742 (1920), 4th edition.

Agricultural Chemicals for April 1952, pp. 54, 55, 56, 143, 145, 146, 147, 149, 151. (Copy in Div. 43.)